United States Patent
Sasson et al.

(10) Patent No.: US 10,142,935 B2
(45) Date of Patent: Nov. 27, 2018

(54) AUTONOMOUS RECEIVE (RX) DETECTOR FOR A RADIO MODULE

(71) Applicant: QUALCOMM Incorporated, San Diego, CA (US)

(72) Inventors: Oron Sasson, Haifa (IL); Alon Yehezkely, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/413,488

(22) Filed: Jan. 24, 2017

(65) Prior Publication Data

US 2017/0215144 A1 Jul. 27, 2017

Related U.S. Application Data

(60) Provisional application No. 62/287,367, filed on Jan. 26, 2016.

(51) Int. Cl.
*H04W 84/18* (2009.01)
*H04W 52/02* (2009.01)
*H04W 24/08* (2009.01)
*H04L 27/227* (2006.01)

(52) U.S. Cl.
CPC ..... *H04W 52/0229* (2013.01); *H04L 27/2271* (2013.01); *H04W 24/08* (2013.01); *H04W 52/028* (2013.01); *Y02D 70/00* (2018.01); *Y02D 70/142* (2018.01); *Y02D 70/164* (2018.01)

(58) Field of Classification Search
USPC .............................. 345/211, 539.11
See application file for complete search history.

(56) References Cited

U.S. PATENT DOCUMENTS

| 4,001,828 A * | 1/1977 | Culpepper | G01S 3/46 342/419 |
| 5,790,946 A | 8/1998 | Rotzoll | |
| 7,711,868 B2 * | 5/2010 | Rhoten | G06F 1/3203 710/15 |
| 2014/0253322 A1 * | 9/2014 | Chapin | G08B 1/08 340/539.11 |
| 2016/0054436 A1 * | 2/2016 | Lee | G01S 13/04 345/211 |

OTHER PUBLICATIONS

International Search Report and Written Opinion—PCT/US2017/014876—ISA/EPO—dated Apr. 13, 2017.

* cited by examiner

*Primary Examiner* — Eva Puente
(74) *Attorney, Agent, or Firm* — Patterson & Sheridan, L.L.P.

(57) ABSTRACT

Certain aspects of the present disclosure provide methods and apparatus for autonomous receive (RX) detection. One example method for wireless communications generally includes powering down a portion of a receive path in a first module; detecting, in a second module comprising another portion of the receive path, that a radio frequency (RF) signal has been received by the second module while the portion of the receive path in the first module is powered down; and sending a control signal to power up the portion of the receive path in the first module, based on the detection.

28 Claims, 7 Drawing Sheets

AUTONOMOUS RECEIVE (RX) DETECTOR FOR A RADIO MODULE

CLAIM OF PRIORITY UNDER 35 U.S.C. § 119

The present application claims the benefit of U.S. Provisional Application Ser. No. 62/287,367, entitled "AUTONOMOUS RECEIVE (RX) DETECTOR FOR A 60 GHz RADIO MODULE" and filed Jan. 26, 2016, which is assigned to the assignee of the present application and is expressly incorporated by reference herein in its entirety.

BACKGROUND

Field of the Disclosure

Certain aspects of the present disclosure generally relate to wireless communications and, more particularly, to an autonomous receive (RX) detector for a radio module.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed. Once such scheme allows multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters). Another scheme to achieve greater throughput is multi-gigabit speed wireless communications technology operating over the unlicensed 60 GHz frequency band in accordance with the IEEE 802.11ad protocol as promoted by the Wireless Gigabit Alliance (WiGig).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved communications in a wireless network.

Certain aspects of the present disclosure generally relate to an autonomous receive (RX) detector for a radio module, such as a 60 GHz radio module.

Certain aspects of the present disclosure provide a method for wireless communications. The method generally includes detecting, in a first module comprising a portion of a receive path, whether a radio frequency (RF) signal has been received; and if the received RF signal is detected, sending a control signal to wake up a second module comprising another portion of the receive path that was previously powered down.

Certain aspects of the present disclosure an apparatus for wireless communications. The apparatus generally includes a first module comprising a portion of a receive path and a detector coupled to the receive path, the detector being configured to detect whether an RF signal has been received; and a second module coupled to the first module and comprising another portion of the receive path, the first module being configured to send a control signal to wake up the other portion of the receive path if the received RF signal is detected by the detector while the other portion of the receive path is powered down.

Certain aspects of the present disclosure an apparatus for wireless communications. The apparatus generally includes means for detecting, in a first module comprising a portion of a receive path, whether an RF signal has been received; and means for sending a control signal to wake up a second module comprising another portion of the receive path that was previously powered down, if the received RF signal is detected. For certain aspects, the apparatus further includes means for powering down the other portion of the receive path in the second module during an idle mode before detection of the received RF signal.

Certain aspects of the present disclosure provide a non-transitory computer-readable medium for wireless communications, comprising instructions executable by a processing system to: power down a portion of a receive path in a first module; detect, in a second module comprising another portion of the receive path, that an RF signal has been received by the second module while the portion of the receive path in the first module is powered down; and send a control signal to power up the portion of the receive path in the first module, based on the detection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
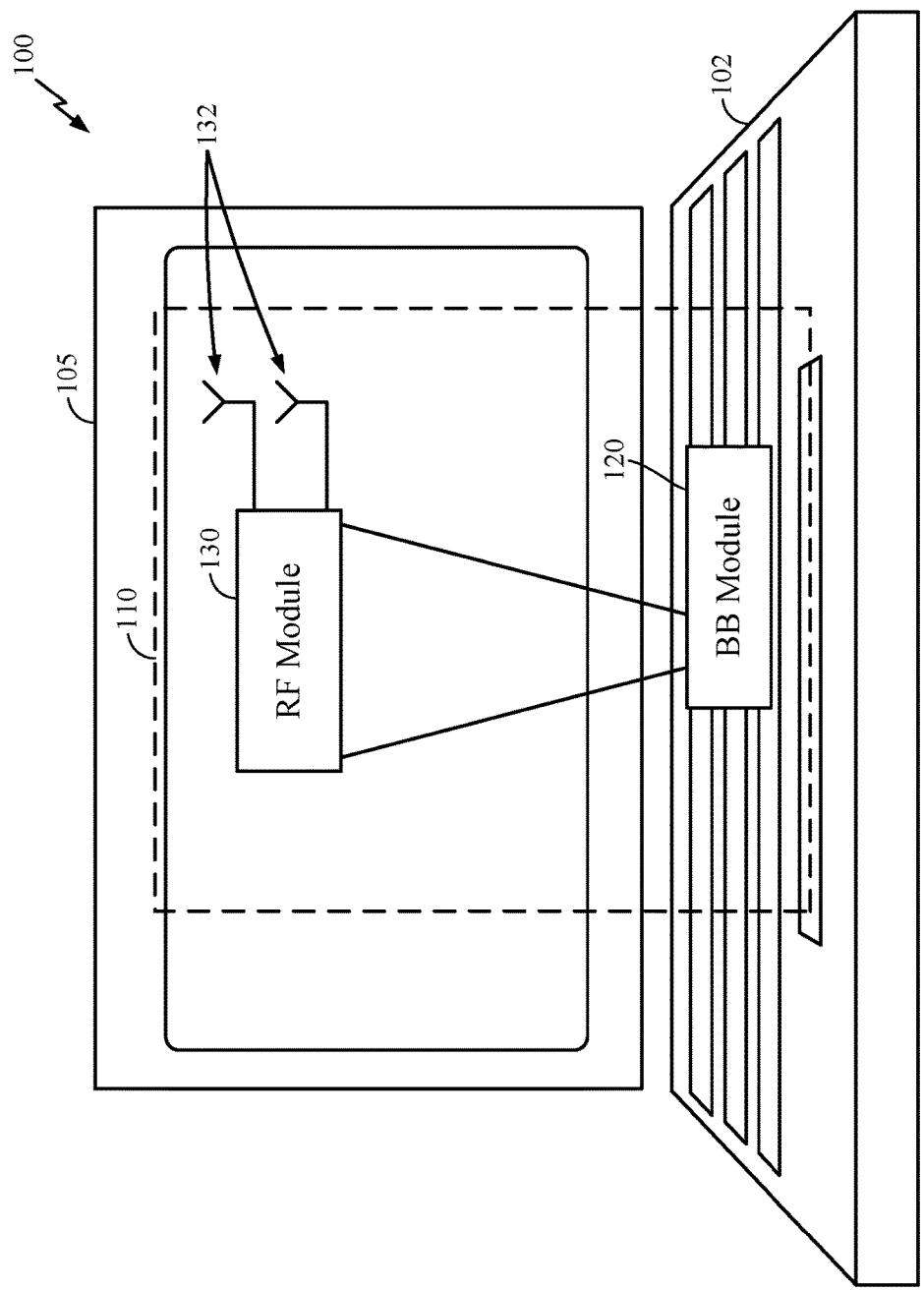
FIG. 1 is a diagram illustrating an example laptop computer having radio transmission and/or reception capabilities with separate radio and core modules, in accordance with certain aspects of the present disclosure.

Certain aspects of the present disclosure generally relate to powering up a radio system by sensing a received signal. The radio system may comprise a receive (RX) chain that is divided onto two or more separate modules, such that one portion of the RX chain resides on one module and another portion of the RX chain resides on another module. One portion of the RX chain may be powered down for power savings during an idle mode for the radio system. However, if a radio frequency (RF) signal is received by another portion of the RX chain, the other portion detects the received RF signal and causes the powered down portion to wake up for a normal operational mode. Certain aspects of the present disclosure provide methods and apparatus for the detection of the received RF signal in only a portion of the RX chain, in a power-efficient manner.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

The 60 GHz band is an unlicensed band which features a large amount of bandwidth and a large worldwide overlap. The large bandwidth means that a very high volume of information can be transmitted wirelessly. As a result, multiple applications, that involve transmission of a large amount of data, can be developed to allow wireless communication around the 60 GHz band. Examples for such applications include, but are not limited to, wireless high definition TV (HDTV), wireless docking stations, wireless Gigabit Ethernet, and many others.

A schematic diagram illustrating the assembly of a laptop computer 100 that includes a radio frequency (RF) system 110 for transmission and reception of millimeter wave (mm-wave) signals (e.g., in the 60 GHz band) is shown in FIG. 1. The form factor of the RF system 110 is spread between a base plane 102 and a lid plane 105 of the laptop computer 100. The lid plane 105 may be movable with respect to the base plane 102 to open and close the laptop computer 100. As an example, the base plane 102 may include a motherboard and a keyboard for the laptop computer 100, while the lid plane 105 may include a display and one or more antennas 132.

The RF system 110 includes two parts: a baseband module 120 and an RF module 130, which may be located in the base plane 102 and the lid plane 105, respectively. As another example, in a tablet computer, mobile phone, or other device, the baseband module 120 and the RF module 130 may be disposed at any of various suitable locations therein. For example, the baseband module 120 and the RF module 130 may be located at opposite ends of the tablet, phone, or other device. The RF module 130 may include active transmit (TX) and receive (RX) antennas. When transmitting signals, the baseband (BB) module 120 may provide the RF module 130 with control, local oscillator (LO), intermediate frequency (IF), and power (DC) signals. The control signals are utilized for certain functions, such as gain control, RX/TX switching, power level control, sensors, and detector readouts. Specifically, beam-forming-based RF systems my involve high frequency beam steering operations that are performed under the control of the baseband module 120. The control may originate at the baseband module 120 of the system and transfer between the baseband module 120 and the RF module 130.

The RF module 130 may perform upconversion, using a mixer (not shown) on IF signals for converting to RF signals, and then may transmit the RF signals through the antennas 132 according to the control of the control signals. The power signals may be DC voltage signals that power the various components of the RF module 130.

In the receive direction, the RF module 130 may receive RF signals (e.g., at the frequency band of 60 GHz), through the active RX antenna, may perform downconversion using a mixer to IF signals using the LO signals, and may send the IF signals to the baseband module 120. The operation of the RF module 130 is controlled by the control signals, but certain control information (e.g., a feedback signal) is sent back to the baseband module 120.

To increase the radio coverage, the RF system 110 may include multiple antenna arrays. That is, the RF system 110 may utilize antenna diversity to improve the quality and reliability of the wireless link. The antenna arrays may include, for each direction, multiple active antenna arrays (e.g., a phased array) in which each element can be controlled individually to enable the usage of beam-forming techniques.

Example RX Detector

As described above, a radio frequency system (e.g., a 60 GHz system) may consist of a core module (e.g., BB module 120) and a radio (antenna) module (e.g., RF module 130). During idle associated and idle unassociated periods, it is desirable to power down as much circuitry as possible. However, in order to preserve received signal detectability, it may be desirable for the receive (RX) channel (also known as a receive path or receive chain) to active. The RX channel may consist of all the radio module plus digital circuitry in the core module (e.g., baseband amplifiers, an analog-to-digital converter (ADC), physical layer (PHY) correlators, etc.), which may dominate power consumption. It is advantageous to keep only the radio module awake with a capability of sensing the received signal and waking up the complete RX chain in the core module if a received signal is detected.

Significant power consumption may occur due to the core module operation during different idle modes. These idle modes can occupy a significant portion of the device functionality time and, hence, have a significant impact on power consumption. In one solution, the entire RX chain remains functional (e.g., awake) on both modules, but this solution is power hungry. The challenge addressed herein is how to power down as much circuitry as possible by performing RX detection in the radio module only and provide a power-efficient detector in the radio module. In order to accomplish this, the radio module may most likely be capable of applying a correlator on the received signal for detection.

Certain aspects of the present disclosure provide a system that allows the portion of the receive path residing in the core module to be turned off (which would otherwise dominate power consumption) and uses a low-power and small-area mechanism that enables RX detection with very little power penalty. In this manner, power is reduced for several components, including: (1) the ADC (e.g., eliminating the use of high-speed, higher resolution (e.g., 7-bit) ADCs in the core module during idle modes and replacing the functionality with a low-speed, lower resolution (e.g., 1-bit) ADC in the radio module); (2) the in-phase (I)/quadrature (Q) mixer, local oscillator (LO), intermediate frequency (IF), and/or baseband variable gain amplifier (VGA) in the core module may be turned off, and the functionality may be replaced with a low-power LO, a mixer, and/or a fixed gain amplifier; and/or (3) the "initial acquisition" (INA) detector in the core module may be turned off and may be replaced by a simpler detector in the radio module.

Figure 2:
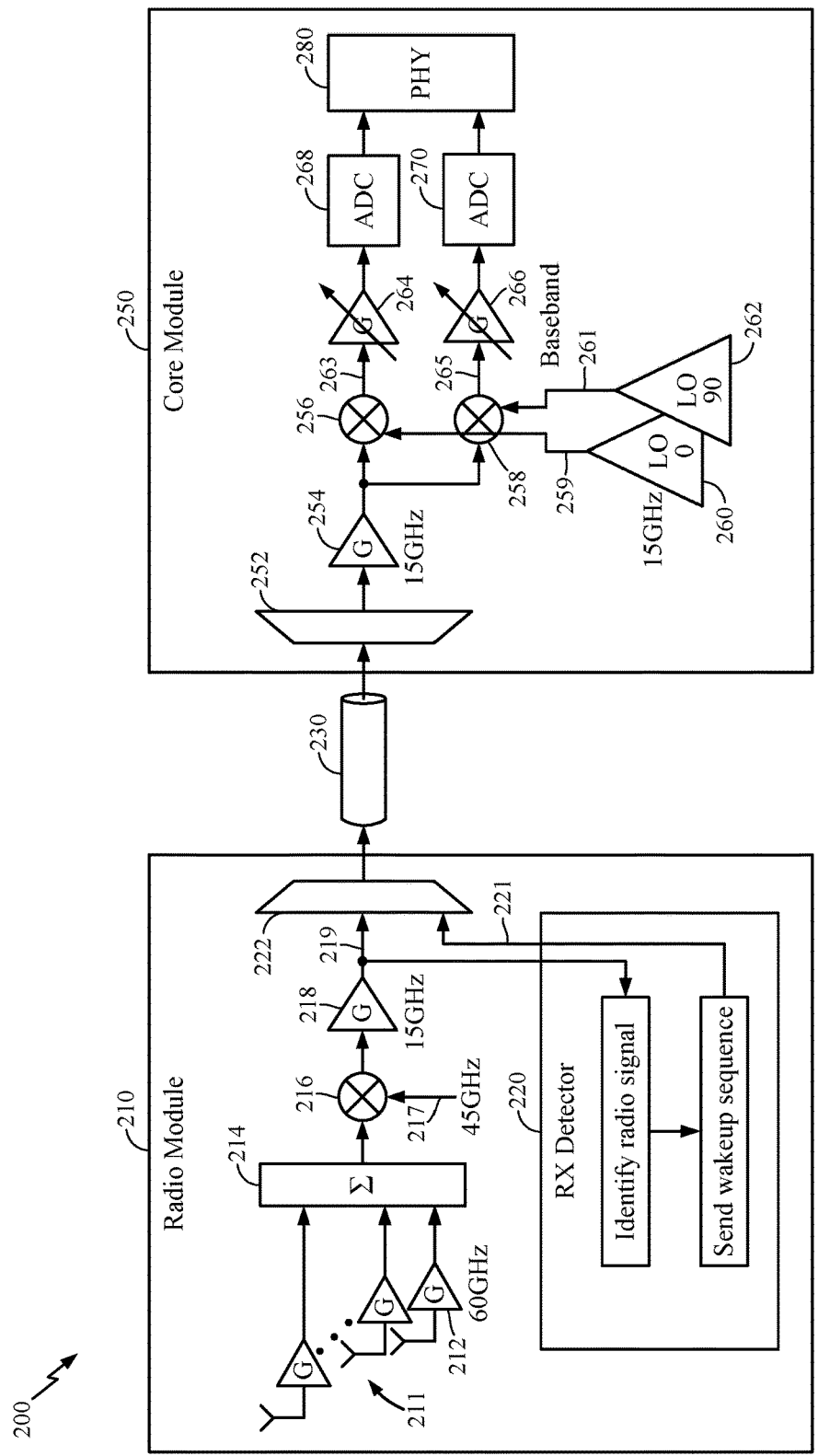
FIG. 2 is a block diagram of an example wireless device comprising a radio module and a core module, in accordance with certain aspects of the present disclosure.

FIG. 2 is a block diagram of an example system 200 comprising a radio module 210 (which may be analogous to RF module 130) and a core module 250 (which may be analogous to BB module 120) connected by an interconnect 230 (e.g., a cable), in accordance with certain aspects of the present disclosure. The interconnect 230 may be implemented with a flexible interconnect (e.g., a cable or a flexible printed circuit (FCP)) or a rigid interconnect (e.g., a printed circuit board (PCB)). The core module 250 may include or be considered as a mobile station modem (MSM), for example. During "idle associated" and "idle unassociated" periods, the radio module 210 should be powered ON, but the core module 250 may dominate the power consumption if not turned OFF. Certain aspects of the present disclosure provide an RX detector 220 in the radio module 210 that uses the main RX chain to detect an RX signal and allows turning off the RX circuitry in the core module 250.

The radio module 210 may include or be coupled to one or more antennas 211 (e.g., arranged in an antenna array). The radio module 210 may also comprise one or more amplifiers 212, a combiner 214, a mixer 216, an amplifier 218, one or more filters (not shown), and a multiplexer (MUX) 222. The antenna(s) 211 may receive radio frequency (RF) signals, such as mm-wave signals (e.g., in the 60 GHz band). The received signals may be amplified by the amplifier(s) 212, which may be implemented with low noise amplifiers (LNAs), for example. The amplified output signals from the amplifiers 212 may be combined (e.g., summed) in the combiner 214, and the combined output signal from the combiner may be mixed with a local oscillator (LO) signal 217 (e.g., having a frequency of 45 GHz) in the mixer 216 in an effort to downconvert the combined output signal to an intermediate frequency (IF) signal. For certain aspects, the combined output signal may be amplified (or buffered) by an amplifier 215 (illustrated in FIG. 3) before the mixing. The mixer 216 actually produces the sum and difference of the two input frequencies, and a low pass filter (not shown) may be used to filter out the summed frequencies, leaving only the subtracted frequencies (e.g., 60 GHz–45 GHz=15 GHz) to produce the IF signal. This IF signal may be amplified (or buffered) by the amplifier 218. The RX detector 220 may detect whether a signal has been received based on the amplified IF signal 219 and may output a control signal 221 (e.g., with a wakeup sequence for the core module 250) based on the detection. The amplified IF signal 219, the control signal 221 from the RX detector 220, and/or other signals (e.g., sensor signals) may be multiplexed by the MUX 222 and transmitted via the interconnect 230 to the core module 250.

As illustrated in FIG. 2, the core module 250 may include a demultiplexer 252, an amplifier 254, mixers 256, 258, frequency synthesizers 260, 262, variable gain amplifiers (VGAs) 264, 266, analog-to-digital converters (ADCs) 268, 270, and a physical (PHY) layer module 280. Signals received by the core module 250 via the interconnect 230 may be demultiplexed by the demultiplexer 252. The amplified IF signal 219 may be amplified (or buffered) by the amplifier 254. The output of the amplifier 254 may be mixed, in mixer 256, with an in-phase (I) LO signal 259 produced by frequency synthesizer 260. The output of the amplifier 254 may also be mixed, in mixer 258, with a quadrature (Q) LO signal 261 produced by frequency synthesizer 262. The I/Q LO signals 259, 261 may have nearly the same frequency (e.g., about 15 GHz) as the signal output by the amplifier 254 in an effort to downconvert the IF signal to I/Q baseband signals. Low pass filters (not shown) may be used to filter out the summed frequencies from the mixers 256, 258, leaving only the subtracted frequencies to produce the I/Q baseband signals 263, 265. These I/Q baseband signals 263, 265 may be amplified (or buffered) by the VGAs 264, 266 and converted to digital I/Q signals by the ADCs 268, 270. For example, the ADCs 268, 270 may be high-speed, high resolution (e.g., 7-bit) ADCs. The digital I/Q signals may be further processed by the PHY module 280, which may include PHY correlators.

Figure 3:
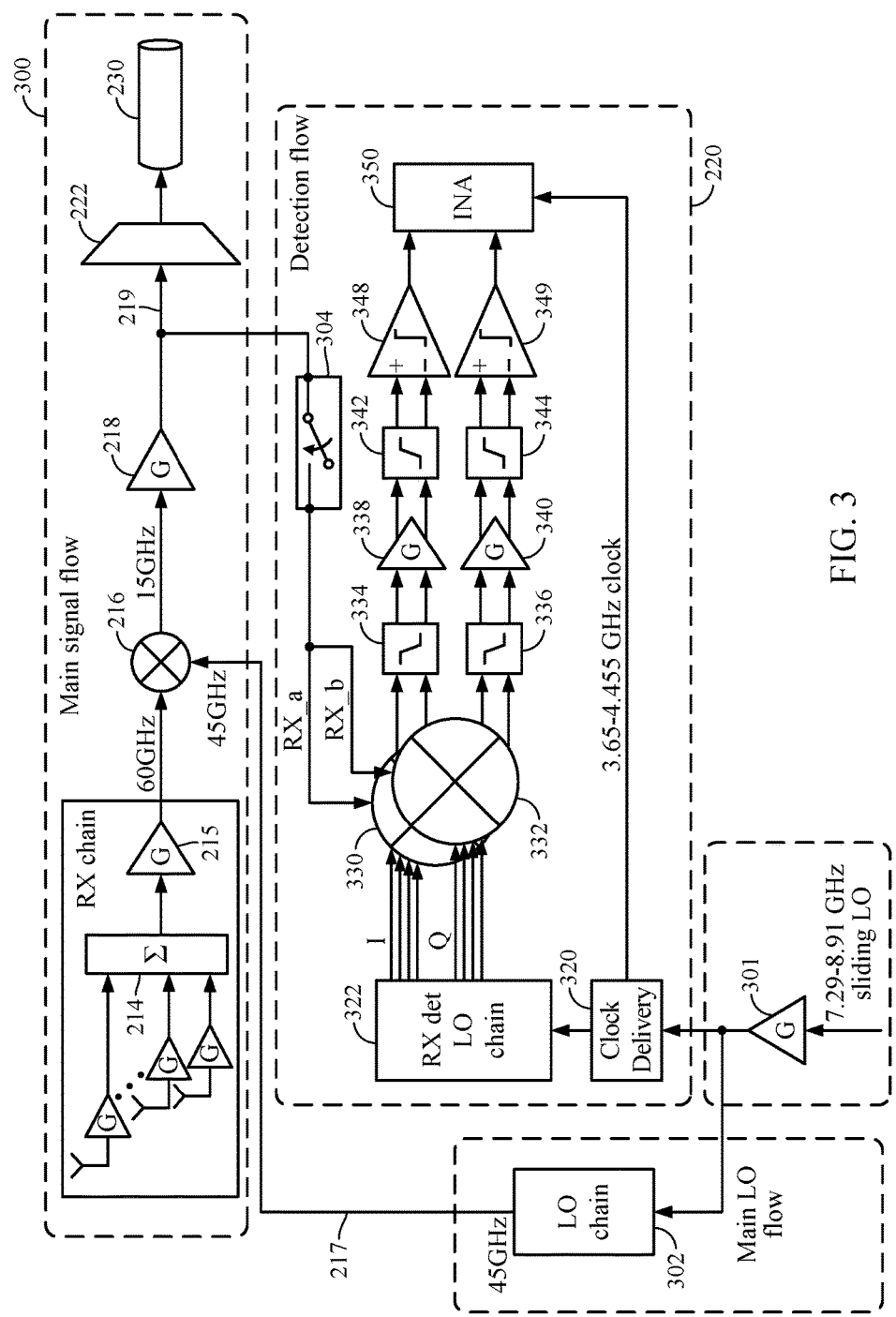
FIG. 3 is a block diagram of an example radio module with a receive (RX) detector, in accordance with certain aspects of the present disclosure.

FIG. 3 illustrates a radio module 210 including an example RX detector 220 in more detail, in accordance with certain aspects of the present disclosure. Thus, FIG. 3 portrays the main signal flow 300 of the RX chain and the detection flow of the RX detector 220. The RX detector 220 may include a clock delivery circuit 320, a RX detection LO chain 322, mixers 330, 332, low-pass filters 334, 336, amplifiers 338, 339, high-pass filters 342, 344, ADCs 348, 349, and an INA detector 350. For certain aspects, supporting circuitry for the RX detector 220 may include an amplifier 301, which may also drive a LO chain 302 for generating the LO signal 217 (e.g., with a frequency of 45 GHz) for the mixer 216 (e.g., the main LO flow in the radio module 210). The supporting circuitry for the RX detector 220 may also include a switch 304 configured to selectively connect the RX detector to the RX chain for detecting whether an RF signal has been received.

Figure 4:
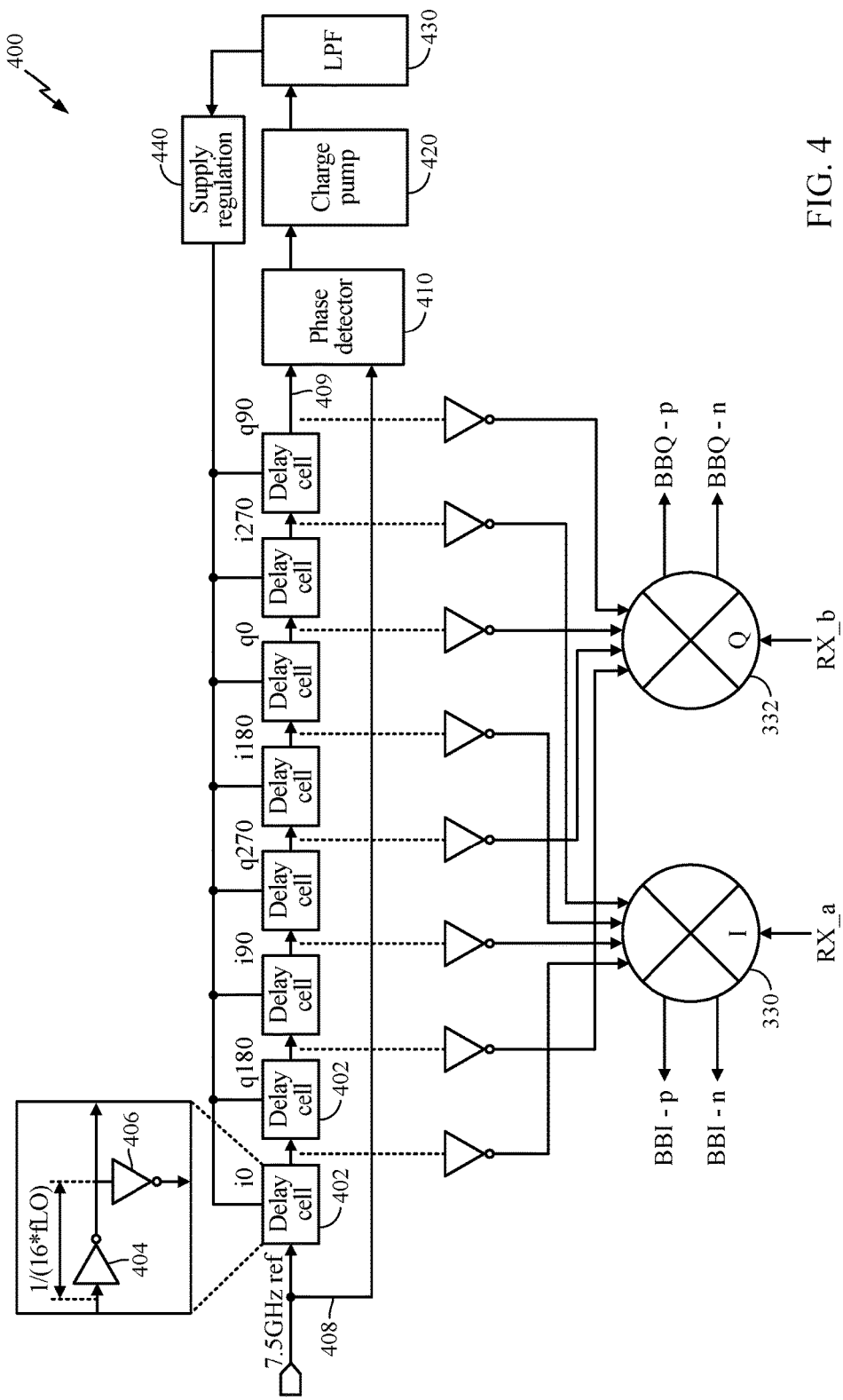
FIG. 4 is a block diagram of an example delay-locked loop (DLL) for generating various phases of a local oscillator (LO) signal for mixing in the RX detector of FIG. 3, in accordance with certain aspects of the present disclosure.

In the RX detector 220, the clock delivery circuit 320 may receive a periodic signal driven by the amplifier 301. The amplifier 301 may receive a sliding LO signal (e.g., having a frequency range of 7.29 to 8.91 GHz). The clock delivery circuit 320 may include any suitable circuitry for delivery periodic signals, such as a clock distribution network, delay elements, and/or frequency dividers. The clock delivery circuit may output a periodic signal to the RX detection LO chain 322 and a clock signal (e.g., having a frequency range of 3.65 to 4.455 GHz, which is half the example frequency range input to the amplifier 301) for clocking the INA detector 350. The RX detection LO chain 322 may generate different phases of the received periodic signal and may be implemented with a delay-locked loop (DLL), for example, as illustrated in FIG. 4. In the example of FIG. 3, the RX detection LO chain 322 generates eight different signals with eight different phases (I0, I90, I180, I270, Q0, Q90, Q180, and Q270) and output these LO signals to in-phase (I) mixer 330 and quadrature (Q) mixer 332.

Figure 5:
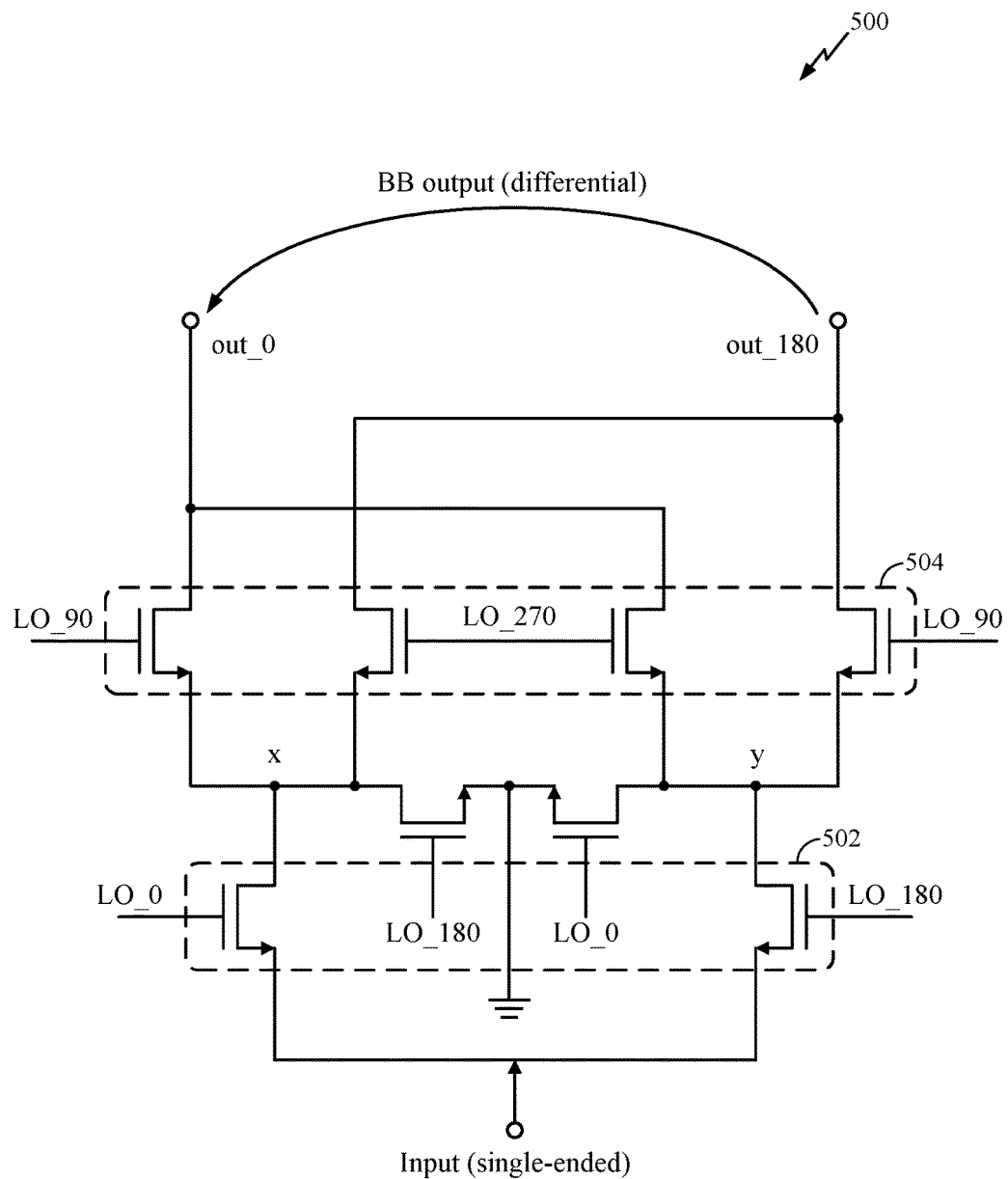
FIG. 5 is a schematic diagram of an example sub-harmonic mixer in the RX detector of FIG. 3, in accordance with certain aspects of the present disclosure.

The RX detector 220 may receive a signal from a portion of the RX chain residing in the radio module 210. For example, the RX detector 220 may receive an IF signal, such as the amplified IF signal 219 at the output of the amplifier 218, as illustrated in FIG. 3. The signal received from the RX chain may be mixed with the multi-phase LO signals generated by the RX detection LO chain 322 in the I and Q mixers 330, 332. The multi-phase LO signals may have a certain frequency selected such that the signal received from the RX chain (e.g., an IF signal) may be downconverted to differential I baseband signals (BBI_p and BBI_n) and differential Q baseband signals (BBQ_p and BBQ_n). For certain aspects, the I and Q mixers 330, 332 may be implemented as sub-harmonic mixers, as illustrated in FIG. 5. The differential outputs of the I and Q mixers 330, 332 may be filtered by the low-pass filters 334, 336, respectively, to filter out the summed frequencies from the mixers 330, 332, leaving only the subtracted frequencies to produce the differential I/Q baseband signals. These I/Q baseband signals may be amplified (or buffered) by the amplifiers 338, 339, respectively, and the amplified differential I/Q baseband signals may be filtered by the high-pass filters 342, 344, respectively.

The filtered, differential I/Q baseband signals may be output from the high-pass filters 342, 344 to the ADCs 348, 349, respectively. The ADCs 348, 349 in the RX detector 220 may have lower speed and/or lower resolution than the ADCs 268, 270 in the core module 250. For example, the ADCs 348, 349 may be implemented with comparators, as depicted in FIG. 3, which function as 1-bit ADCs. The digital outputs of the ADCs 348, 349 may be received by the INA detector 350 for digital processing to determine whether an RF signal was received by the RX chain. The INA detector 350 may be a simpler INA detector than one present in the PHY module 280 of the core module 250. For some aspects, the INA detector 350 may generate the control signal 221, which may include a wakeup sequence for the core module 250, as described above.

Embedding a power-efficient RX detector 220 in the radio module 210 permits powering down most of the main RX chain (e.g., at least a portion of the RX chain in the core module 250). Using the already amplified radio signal (e.g., the amplified IF signal 219) from the main RX chain as an input to the RX detector 220 avoids adding dedicated RF amplifiers for the RX detector. Sub-harmonic mixers may be employed for the I and Q mixers 330, 332 to allow the use of a low LO frequency of 7.5 GHz, a frequency just low enough to keep the LO design inductor-less, hence small, while still consuming low power. A simpler INA detector 350 may be added in the RX detector 220 to perform correlation on the input signal for detection, and 1-bit based correlators (e.g., comparators) may be utilized for simplification. If an RX signal is detected, the RX detector 220 may send a wakeup sequence to the core module 250 to wake up the full RX chain.

FIG. 4 is a block diagram of an example supply-tuned delay-locked loop (DLL) 400 for generating various phases of an LO signal for mixing in the RX detector 220 of FIG. 3, in accordance with certain aspects of the present disclosure. The DLL 400 comprises a plurality of delay cells 402, a phase detector 410, a charge pump 420, a low-pass filter (LPF) 430, and a supply regulation circuit 440. The delay cells 402 are connected in series to effectively produce a variable delay line with a tap at the output of each delay cell. Each delay cell 402 may include an inverter 404 and an inverter 406. The total delay of the delay line is locked by the DLL 400 to the clock period of the reference signal 408 (e.g., a 7.5 GHz reference signal), which may be the input to the RX detection LO chain 322. The phase detector 410 compares the phase of the output signal 409 from the last delay cell 402 in the chain with the phase of the reference signal 408 to generate an error signal, which is effectively integrated by the charge pump 420, filtered by the LPF 430, and fed back to the delay cells 402 as a control signal via the supply regulation circuit 440, which adjusts the supply voltages (and hence, the delay) of the inverters 404 in the delay cells based on the output of the LPF 430. The inverter-based LO chain illustrated in FIG. 4 creates eight different phases (I0, I90, I180, I270, Q0, Q90, Q180, and Q270) for the I mixer 330 and the Q mixer 332. The phases are adjusted by the supply-tuned DLL 400 as described above.

Although FIG. 4 illustrates a supply-tuned DLL 400, other types of DLLs with different control mechanisms can be used to implement the RX detection LO chain 322. For example, instead of a supply regulation circuit 440, the LPF 430 can output a dedicated control signal to each delay cell 402.

FIG. 5 is a schematic diagram of an example sub-harmonic mixer 500, which may be employed to implement the I mixer 330 or the Q mixer 332 in the RX detector 220 of FIG. 3, in accordance with certain aspects of the present disclosure. The sub-harmonic mixer 500 may be driven by an LO signal (e.g., a 7.5 GHz LO signal from the RX detection LO chain 322) and may downconvert an IF band (e.g., at 15 GHz) to DC or near DC. The mixer 500 inherently performs single-ended-to-differential conversion. The first downconversion in the bottom row of transistors 502 may mix the 15 GHz IF signal with a 7.5 GHz LO to create an x-y differential signal at 7.5 GHz. The second downconversion in the top row of transistors 504 may mix the 7.5 GHz differential signal with the 7.5 GHz LO down to baseband.

Figure 6:
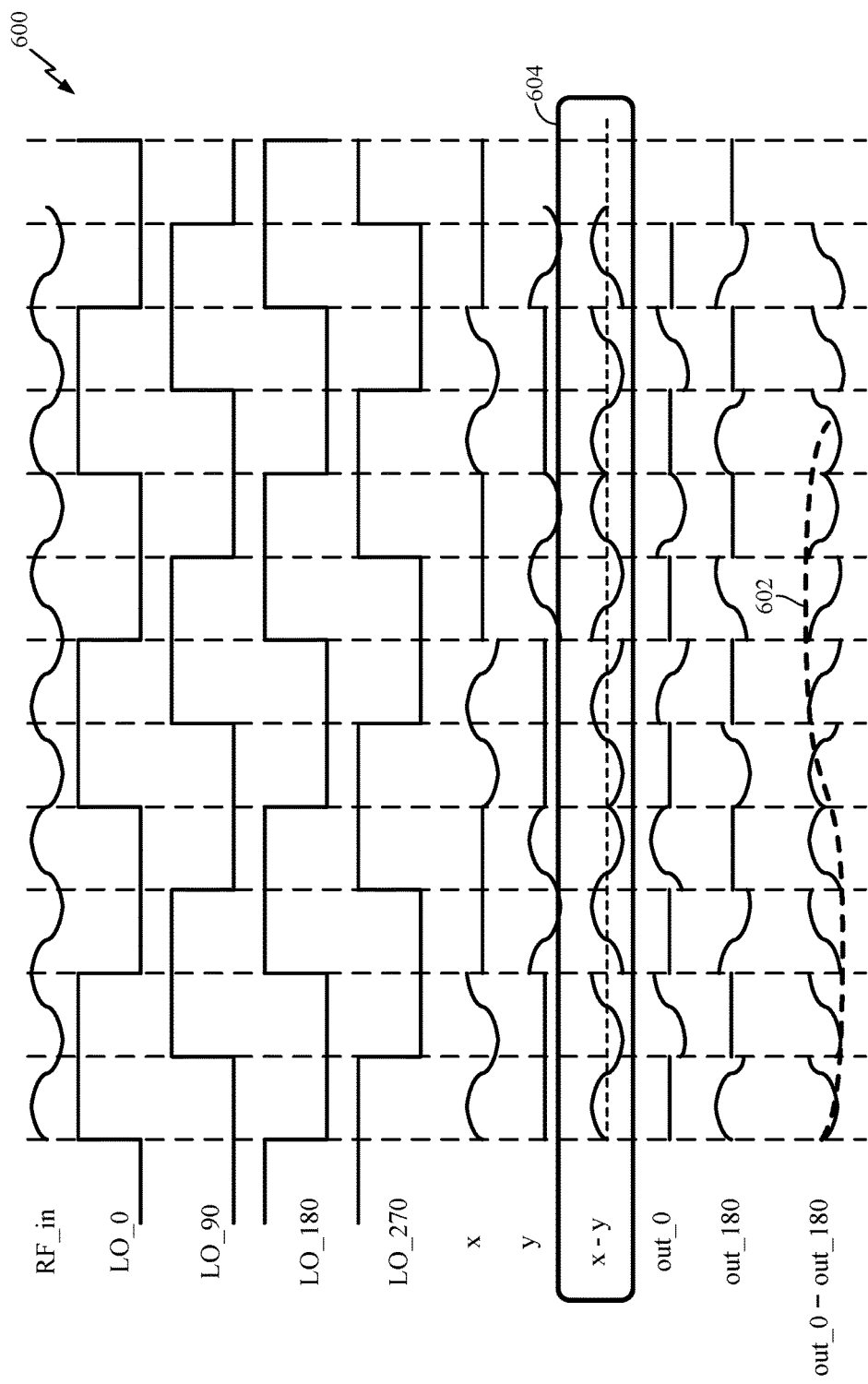
FIG. 6 is an example timing diagram of the various phases of the LO signal in FIG. 4 for applying to the sub-harmonic mixer of FIG. 5, in accordance with certain aspects of the present disclosure.

FIG. 6 is an example timing diagram 600 of the various phases of the LO signal in FIG. 4 (e.g., I0, I90, I180, and I270) for applying to the sub-harmonic mixer 500 of FIG. 5, in accordance with certain aspects of the present disclosure. The received RX input (RX_in) is downconverted to a lower frequency (e.g., a baseband frequency). Applying a low-pass filter (LPF) to the differential output (out_0-out_180) may yield the dashed curve 602 at the bottom of the timing diagram 600. The mixer 500 switches the x and y nodes between RX input and ground, thereby creating a differential signal (x-y) 604.

Figure 7:
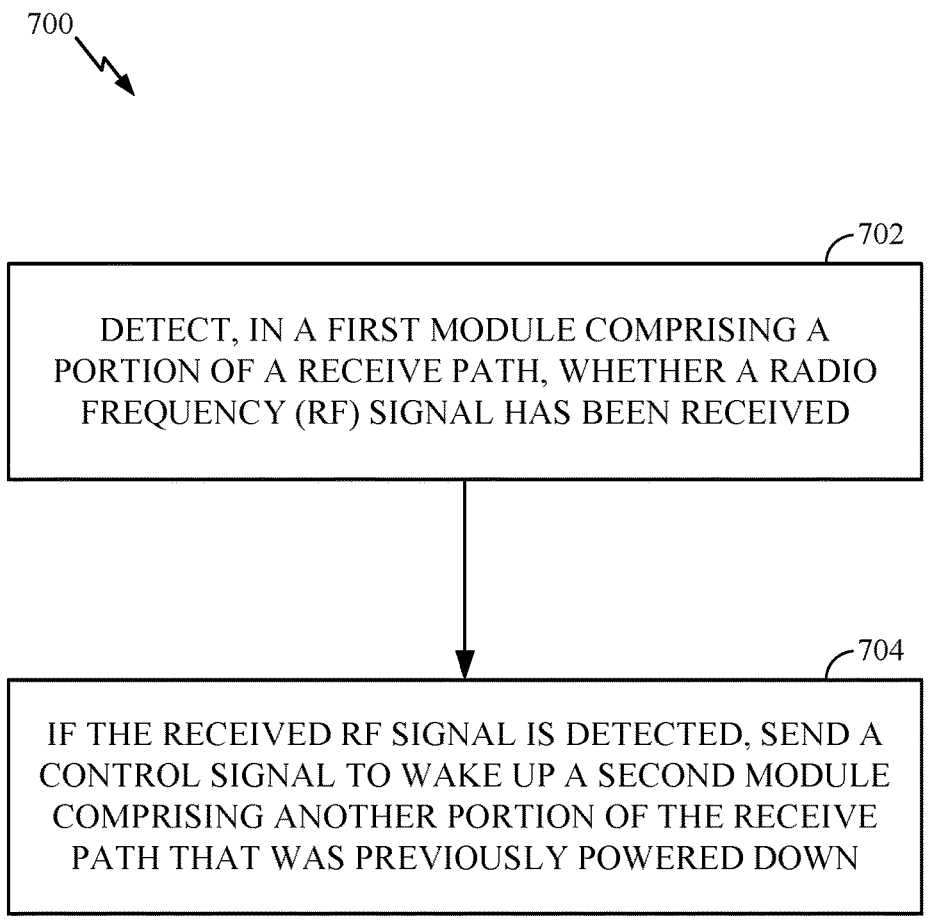
FIG. 7 is a flow diagram of example operations for autonomous RX path detection, in accordance with certain aspects of the present disclosure.

FIG. 7 is a flow diagram of example operations 700 for autonomously detecting received signals in a receive path, in accordance with certain aspects of the present disclosure. The operations 700 may be performed by, for example, an apparatus (e.g., the system 200 with an RX detector 220).

The operations 700 may begin, at block 702, with the apparatus detecting, in a first module (e.g., radio module 210) comprising a portion of a receive path, whether an RF signal has been received. If the received RF signal is detected at block 702, the apparatus sends, at block 704, a control signal to wake up a second module (e.g., the core module 250). The second module includes another portion of the receive path that was previously powered down.

According to certain aspects, the second module is located remotely from the first module. The second module may be connected with the first module via an interconnect (e.g., interconnect 230, which may be a rigid interconnect, such as a printed circuit board (PCB), or a flexible interconnect, such as a cable or flexible printed circuit (FPC)).

According to certain aspects, the operations 700 further involve the apparatus powering down the other portion of the receive path in the second module during an idle mode before the detecting at block 702.

According to certain aspects, the operations 700 further involve the apparatus powering up the other portion of the receive path in the second module based on the control signal.

According to certain aspects, the other portion of the receive path in the second module includes at least one of baseband circuitry or an analog-to-digital converter.

According to certain aspects, the portion of the receive path in the first module includes one or more antennas, a mixer, a first amplifier, and a second amplifier. For certain aspects, the detecting at block 702 involves the apparatus receiving the RF signal via the one or more antennas; amplifying the received RF signal with the first amplifier; mixing the amplified RF signal with a first local oscillating signal in the mixer to generate a lower frequency signal; and amplifying the lower frequency signal with the second amplifier. For certain aspects, the detecting at block 702 further entails mixing the amplified lower frequency signal with different phases of a second local oscillating signal to generate a baseband signal; converting a version of the baseband signal (e.g., a filtered version of the baseband signal after filtering) to a digital signal (e.g., using a comparator); and using the digital signal to detect whether the RF signal has been received. For certain aspects, the operations 700 further include the apparatus generating the different phases of the second local oscillating signal using a delay-locked loop (DLL). For certain aspects, the operations 700 further involve the apparatus amplifying the baseband signal with a fixed gain amplifier to generate the version of the baseband signal. The baseband signal may be a differential signal or a single-ended signal. For certain aspects, the amplified lower frequency signal is mixed with the different phases of the second local oscillating signal in a sub-harmonic mixer. For certain aspects, the operations 700 further entail the apparatus disconnecting the sub-harmonic mixer from an output of the second amplifier for an operational mode of the second module. For certain aspects, the operations 700 further involve the apparatus replicating the amplified lower frequency signal to generate a plurality of replicated signals; and mixing the plurality of replicated signals with the different phases of the second local oscillating signal in a plurality of sub-harmonic mixers.

According to certain aspects, the detecting further involves mixing (e.g., using the mixer 330) the amplified lower frequency signal with a first plurality of phases (e.g., I0, I90, I180, and I270) of a second local oscillating signal to generate a first baseband signal (BBI); mixing (e.g., using the mixer 332) the amplified lower frequency signal with a second plurality of phases (e.g., Q0, Q90, Q180, and Q270) of the second local oscillating signal to generate a second baseband signal (BBQ), wherein the second plurality of phases are different from the first plurality of phases; converting a version of the first baseband signal (e.g., after filtering, amplifying, and/or other processing) to a first digital signal (e.g., using the ADC 348); converting a version of the second baseband signal (e.g., after filtering, amplifying, and/or other processing) to a second digital signal (e.g., using the ADC 349); and using the first and second digital signals to detect whether the RF signal has been received.

Certain aspects of the present disclosure an apparatus for wireless communications. The apparatus generally includes a first module comprising a portion of a receive path and a detector coupled to the receive path, the detector being configured to detect whether an RF signal has been received; and a second module coupled to the first module and comprising another portion of the receive path, the first module being configured to send a control signal to wake up the other portion of the receive path if the received RF signal is detected by the detector while the other portion of the receive path is powered down.

According to certain aspects, the apparatus further includes an interconnect, wherein the second module is coupled to the first module via the interconnect.

According to certain aspects, the other portion of the receive path in the second module is powered down during an idle mode.

According to certain aspects, the other portion of the receive path in the second module comprises at least one of baseband circuitry or an analog-to-digital converter.

According to certain aspects, the portion of the receive path in the first module includes one or more antennas, a first amplifier having an input coupled to the one or more antennas, a first mixer having a first input coupled to an output of the first amplifier and having a second input coupled to a first LO generation circuit, and a second amplifier coupled to an output of the first mixer. For certain aspects, the apparatus further includes a second LO generation circuit having a plurality of outputs and configured to generate a different phase of an LO signal at each of the plurality of outputs; a second mixer having a plurality of inputs coupled to the plurality of outputs of the second LO generation circuit and having another input coupled to an output of the second amplifier; a converter (e.g., a comparator) having inputs coupled to outputs of the second mixer; and a detector having inputs coupled to an output of the converter. For certain aspects, the second LO generation circuit comprises a delay-locked loop (DLL). For certain aspects, the apparatus further includes a first filter having inputs coupled to the outputs of the second mixer; a third amplifier having inputs coupled to outputs of the first filter; and a second filter having inputs coupled to outputs of the third amplifier and outputs coupled to the inputs of the converter. For certain aspects, the second mixer is implemented with a sub-harmonic mixer. For certain aspects, the apparatus further includes a switch coupled between the output of the second amplifier and the other input of the second mixer and configured to disconnect the second mixer from the output of the second amplifier while the other portion of the receive path is powered on.

According to certain aspects, the apparatus further includes a second LO generation circuit having a first plurality of outputs and a second plurality of outputs, wherein the second LO generation circuit is configured to generate a first plurality of phases of an LO signal for the first plurality of outputs and to generate a second plurality of phases of the LO signal for the second plurality of outputs, wherein each of the second plurality of phases is different from each of the first plurality of phases; a second mixer having a plurality of inputs coupled to the first plurality of outputs of the second LO generation circuit and having another input coupled to an output of the second amplifier; a third mixer having a plurality of inputs coupled to the second plurality of outputs of the second LO generation circuit and having another input coupled to the output of the second amplifier; a first converter having inputs coupled to outputs of the second mixer; a second converter having inputs coupled to outputs of the third mixer; and a detector having inputs coupled to an output of the first converter and having an output of the second converter.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for detecting may include the RX detector 220 illustrated in FIGS. 2 and 3. Means for sending a control signal may include the RX detector 220 and, more particularly for certain aspects, the INA detector 350 of FIG. 3 or another processing system. Means for powering down may include a processing system, such as the PHY module 280 depicted in FIG. 2.

According to certain aspects, such means may be implemented by processing systems configured to perform the corresponding functions by implementing various algorithms (e.g., in hardware or by executing software instructions). These algorithms may include, for example, an algorithm for detecting, in a first module comprising a portion of a receive path, whether an RF signal has been received; and an algorithm for sending, if the received RF signal is detected, a control signal to wake up a second module comprising another portion of the receive path that was previously powered down. These algorithms may also include powering down the other portion of the receive path in the second module during an idle mode before detection of the received RF signal.

In some cases, rather than actually transmitting a packet (or frame), a device may have an interface to output a packet for transmission. For example, a processor may output a packet, via a bus interface, to an RF front end for transmission. Similarly, rather than actually receiving a packet (or frame), a device may have an interface to obtain a packet received from another device. For example, a processor may obtain (or receive) a packet, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   detecting, in a first hardware circuit module comprising a first portion of a receive path, whether a radio frequency (RF) signal has been received, the first portion of the receive path comprising at least one amplifier coupled to a mixer; and
   if the received RF signal is detected, sending a control signal to wake up a second hardware circuit module comprising a second portion of the receive path that was previously powered down, the first portion of the receive path being coupled in series with the second portion of the receive path, wherein the second portion of the receive path comprises at least one of baseband circuitry or an analog-to-digital converter.

2. The method of claim 1, wherein the second hardware circuit module is located remotely from the first hardware circuit module and wherein the second hardware circuit module is connected with the first hardware circuit module via an interconnect.

3. The method of claim 1, further comprising powering down the second portion of the receive path in the second hardware circuit module during an idle mode before the detecting.

4. The method of claim 1, wherein the first portion of the receive path in the first hardware circuit module further comprises one or more antennas, a first amplifier, and a second amplifier and wherein the detecting comprises:
   receiving the RF signal via the one or more antennas;
   amplifying the received RF signal with the first amplifier;
   mixing the amplified RF signal with a first local oscillating signal in the mixer to generate a lower frequency signal; and
   amplifying the lower frequency signal with the second amplifier.

5. The method of claim 4, wherein the detecting further comprises:
   mixing the amplified lower frequency signal with different phases of a second local oscillating signal to generate a baseband signal;
   converting a version of the baseband signal to a digital signal; and using the digital signal to detect whether the RF signal has been received.

6. The method of claim 5, further comprising generating the different phases of the second local oscillating signal using a delay-locked loop (DLL).

7. The method of claim 5, further comprising amplifying the baseband signal with a fixed gain amplifier to generate the version of the baseband signal.

8. The method of claim 5, wherein the baseband signal is a differential signal.

9. The method of claim 5, wherein the amplified lower frequency signal is mixed with the different phases of the second local oscillating signal in a sub-harmonic mixer.

10. The method of claim 9, further comprising disconnecting the sub-harmonic mixer from an output of the second amplifier for an operational mode of the second hardware circuit module.

11. The method of claim 5, wherein the converting comprises converting the version of the baseband signal to the digital signal using a comparator.

12. The method of claim 4, wherein the detecting further comprises:
mixing the amplified lower frequency signal with a first plurality of phases of a second local oscillating signal to generate a first baseband signal;
mixing the amplified lower frequency signal with a second plurality of phases of the second local oscillating signal to generate a second baseband signal, wherein each of the second plurality of phases is different from each of the first plurality of phases;
converting a version of the first baseband signal to a first digital signal;
converting a version of the second baseband signal to a second digital signal; and
using the first and second digital signals to detect whether the RF signal has been received.

13. An apparatus for wireless communications, comprising:
a first hardware circuit module comprising a first portion of a receive path and a detector coupled to the receive path, the detector being configured to detect whether a radio frequency (RF) signal has been received, wherein the first portion of the receive path comprises at least one amplifier coupled to a first mixer; and
a second hardware circuit module coupled to the first hardware circuit module and comprising a second portion of the receive path, the first portion of the receive path being coupled in series with the second portion of the receive path, wherein the second portion of the receive path comprises at least one of baseband circuitry or at least one converter, the first hardware circuit module being configured to send a control signal to wake up the second portion of the receive path if the received RF signal is detected by the detector while the second portion of the receive path is powered down.

14. The apparatus of claim 13, further comprising an interconnect, wherein the second hardware circuit module is coupled to the first hardware circuit module via the interconnect.

15. The apparatus of claim 13, wherein the second portion of the receive path in the second hardware circuit module is powered down during an idle mode.

16. The apparatus of claim 13, wherein the portion of the receive path in the first hardware circuit module comprises:
one or more antennas;
a first amplifier having an input coupled to the one or more antennas, the first mixer having a first input coupled to an output of the first amplifier and having a second input coupled to a first local oscillator (LO) generation circuit; and
a second amplifier coupled to an output of the first mixer.

17. The apparatus of claim 16, further comprising:
a second LO generation circuit having a first plurality of outputs and a second plurality of outputs, wherein the second LO generation circuit is configured to generate a first plurality of phases of an LO signal for the first plurality of outputs and to generate a second plurality of phases of the LO signal for the second plurality of outputs, wherein each of the second plurality of phases is different from each of the first plurality of phases;
a second mixer having a plurality of inputs coupled to the first plurality of outputs of the second LO generation circuit and having another input coupled to an output of the second amplifier;
a third mixer having a plurality of inputs coupled to the second plurality of outputs of the second LO generation circuit and having another input coupled to the output of the second amplifier;
a first converter having inputs coupled to outputs of the second mixer;
a second converter having inputs coupled to outputs of the third mixer; and
a detector having inputs coupled to an output of the first converter and having an output of the second converter.

18. The apparatus of claim 16, further comprising:
a second LO generation circuit having a plurality of outputs and configured to generate a different phase of an LO signal at each of the plurality of outputs;
a second mixer having a plurality of inputs coupled to the plurality of outputs of the second LO generation circuit and having another input coupled to an output of the second amplifier, the converter having inputs coupled to outputs of the second mixer; and
a detector having inputs coupled to an output of the converter.

19. The apparatus of claim 18, further comprising:
a first filter having inputs coupled to the outputs of the second mixer;
a third amplifier having inputs coupled to outputs of the first filter; and
a second filter having inputs coupled to outputs of the third amplifier and outputs coupled to the inputs of the converter.

20. The apparatus of claim 18, wherein the second mixer comprises a sub-harmonic mixer.

21. The apparatus of claim 18, further comprising a switch coupled between the output of the second amplifier and the other input of the second mixer and configured to disconnect the second mixer from the output of the second amplifier while the second portion of the receive path is powered on.

22. The apparatus of claim 18, wherein the converter comprises a comparator.

23. The apparatus of claim 18, wherein the second LO generation circuit comprises a delay-locked loop (DLL).

24. A laptop computer comprising the apparatus of claim 13, wherein the first hardware circuit module is disposed in a lid plane of the laptop computer and wherein the second hardware circuit module is disposed in a base plane of the laptop computer.

25. A wireless device comprising the apparatus of claim 13, wherein the first hardware circuit module is disposed at a first end of the wireless device and wherein the second hardware circuit module is disposed at a second end of the wireless device, opposite the first end of the wireless device.

26. An apparatus for wireless communications, comprising:

means for detecting, in a first hardware circuit module comprising a first portion of a receive path, whether a radio frequency (RF) signal has been received, the first portion of the receive path comprising at least one amplifier coupled to a mixer; and means for sending a control signal to wake up a second hardware circuit module comprising a second portion of the receive path that was previously powered down, if the received RF signal is detected, the first portion of the receive path being coupled in series with the second portion of the receive path, wherein the second portion of the receive path comprises at least one of baseband circuitry or an analog-to-digital converter.

27. The apparatus of claim 26, further comprising means for powering down the second portion of the receive path in the second hardware circuit module during an idle mode before detection of the received RF signal.

28. A non-transitory computer-readable medium for wireless communications, comprising instructions executable by a processing system to:

power down a first portion of a receive path in a first hardware circuit module, the first portion of the receive path comprising at least one of baseband circuitry or an analog-to-digital converter;

detect, in a second hardware circuit module comprising a second portion of the receive path, that a radio frequency (RF) signal has been received by the second hardware circuit module while the first portion of the receive path in the first hardware circuit module is powered down, the second portion of the receive path being coupled in series with the first portion of the receive path, wherein the second portion of the receive path comprises at least one amplifier coupled to a mixer; and send a control signal to power up the first portion of the receive path in the first hardware circuit module, based on the detection.

* * * * *